Figure 1:
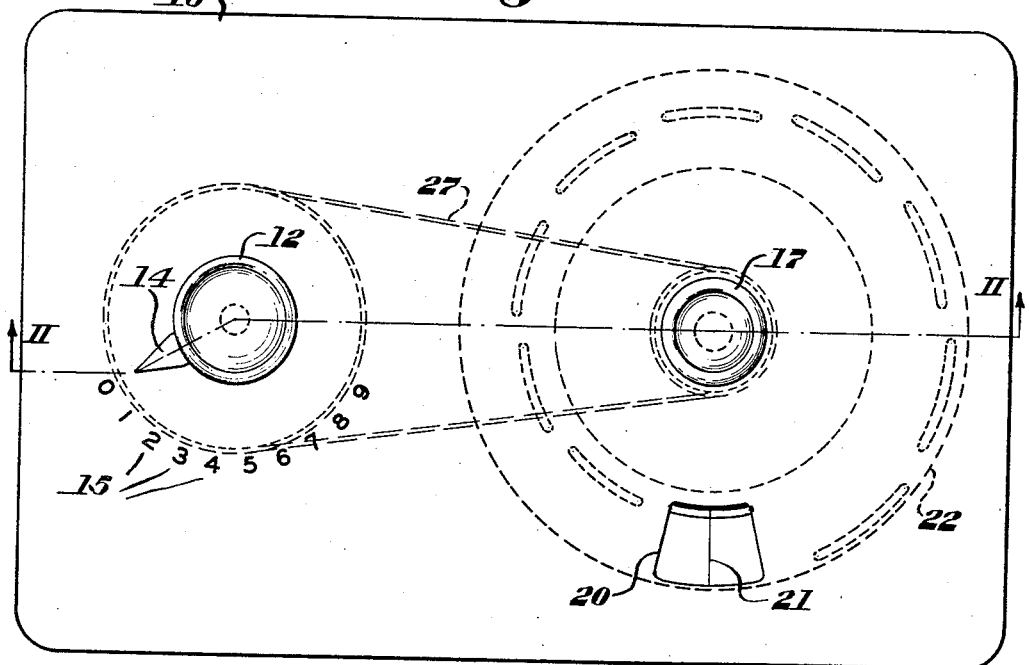

March 9, 1948. G. R. GREENSLADE 2,437,355
INDICATING DIAL FOR RESISTANCE APPARATUS
Filed Aug. 17, 1946

INVENTOR
GROVER R. GREENSLADE
by his attorneys
Stebbins, Blenko & Webb

Patented Mar. 9, 1948

2,437,355

UNITED STATES PATENT OFFICE 2,437,355

INDICATING DIAL FOR RESISTANCE APPARATUS

Grover E. Greenslade, Scott Township, Allegheny County, Pa., assignor to Flannery Bolt Company, Bridgeville, Pa., a corporation of Delaware Application August 17, 1946, Serial No. 691,291

5 Claims. (Cl. 201—48)

This invention relates to apparatus for measuring very low resistances and, in particular, to a direct-reading apparatus utilizing the principle of the Kelvin double bridge.

In my Patent 2,326,352, I disclosed apparatus for testing mechanical parts by measuring the electrical resistance thereof. Said apparatus includes a pair of resistors variable in steps and a pair of resistors in the form of slide wires connected thereto, adapted to form part of a Kelvin double bridge. After an exact balance of the ratio arms of the circuit has been obtained, a calculation is necessary to determine the absolute value of the resistance being measured from the amount of resistance connected in the ratio arms. Calibration tables must be used, therefore, for converting the observed values of the ratio arms to the exact value of the resistance under measurement. It is usually convenient to provide a separate chart or sheet for each setting of the resistors which are variable in steps showing the actual resistances corresponding to the various settings of the slide wires. Such an extensive calibration table is rather inconvenient and involves a loss of time in obtaining final results.

I have invented a novel form of resistance-measuring apparatus which is an improvement over that of my prior patent in that the absolute value of the resistance being measured may be read directly, without the necessity of referring to a calibration table, with a consequent saving in time and increase in convenience and accuracy. In a preferred embodiment, I provide the slide wires with a plurality of scales spaced circumferentially and radially, one for each setting of the resistors which are adjustable in steps, the scales being calibrated to read the resistance in ohms for various settings of the slider with a known resistor of given value serving as a standard of comparison. The slide wire scales may conveniently be mounted on a disc rotating with the moving member of the slide-wire resistor, i. e., the slider arm. In order to insure that the proper scale is read at all times, I provide a screen over the scales having slots spaced circumferentially and radially adapted to expose the scales individually. The screen is connected to the moving member of the resistors variable by steps so that the proper scale on the slide wires is exposed for each setting of the first-mentioned resistors.

Figure 2:
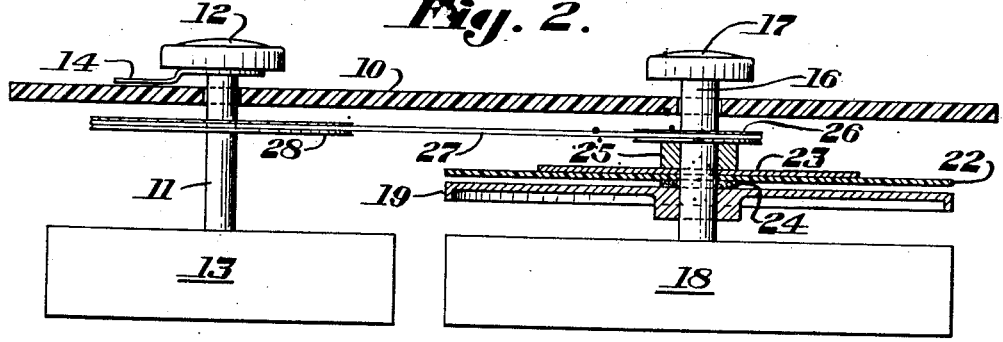
Figure 3:
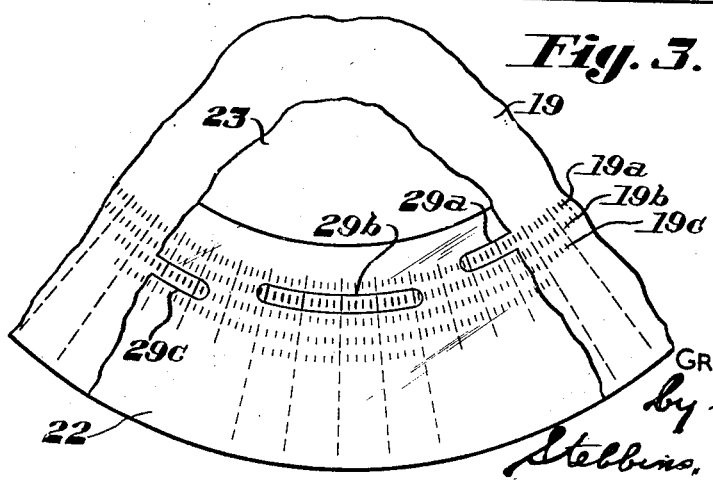

A complete understanding of the invention may be obtained from the following detailed description and explanation which refer to the accompanying drawings. In the drawings, Figure 1 is a partial plan view of the apparatus;

Figure 2 is a partial section taken along the plane of line II—II of Figure 1; and Figure 3 is a partial plan view of the scales with the screen thereabove partly broken away.

Referring in detail to the drawings, a portion of the front panel of a resistance-measuring device such as disclosed in my Patent 2,326,352 is indicated at 10. A shaft 11 projecting through the panel has a knob 12 thereon and serves to vary a pair of resistor units indicated diagrammatically at 13. The knob 12 is provided with a pointer 14 which cooperates with a scale 15 on the panel 10. The resistors 13 constitute the coarse adjustment of a Kelvin double bridge, rotation of the shaft serving to vary the ratio between the values of resistance in the two sides of the bridge.

A shaft 16 also extends through the panel 10 and has a knob 17 thereon. The shaft 16 serves to operate a pair of slide-wire resistors indicated diagrammatically at 18, as disclosed in my patent aforesaid. These resistors constitute the fine adjustment of the bridge. The ratio between the bridge arms, when the bridge is balanced, is determined by reading the setting of the pointer 14 and the position of the slider cooperating with the wires comprising the resistors indicated at 18. For this purpose, a scale disc 19 is secured to the shaft 16. An opening 20 in the panel 10 permits the scale to be viewed from above and a cross wire 21 is mounted above the disc as a fixed index.

The apparatus described so far is generally similar to that shown in my prior patent. The scale disc shown in the patent, however, has only a single scale with graduations showing the proportion of the resistance of the slide wires in the arms of the bridge, respectively. The reading obtained from a measurement with the apparatus of the patent, determined by the setting of the coarse adjustment and that of the slide wires, is only a ratio and requires calculations or the use of calibration tables to obtain the absolute value of the resistance being measured, as explained previously.

By the present invention, I provide a resistance-measuring apparatus which reveals the actual value of the resistance of the specimen directly without calculations or the use of calibration tables. To this end, the disc 19 is provided with a plurality of radially spaced concentric scales 19a, 19b, 19c, etc. The number of scales equals the number of settings of the resistors 13 and each scale is graduated to read ohms of resistance directly. That is to say, the calculations of the resistances indicated by the various settings of the adjustable resistors, for a given value of resistance serving as a standard of comparison, having been made, these values are applied directly to the disc along the several concentric scales. Thus, when the shaft 11 is adjusted so that the pointer 14 is in the zero position, the actual values of resistance indicated for the various positions of the shaft 16 may be read directly from scale 19a. When the pointer 14 is in No. 1 position, scale 19b is read and so on.

In order to preclude the possibility of error resulting from reading the wrong scale, I provide a circular screen 22 composed of transparent colored sheet material overlying the disc 19. The screen 22 is secured to a supporting disc 23. A bearing washer 24 is disposed between the disc 19 and the screen. The disc 23 is secured to a collar or hub 25 rotatable on the shaft 16. The hub 25 has a sheave 26 thereon adapted to be driven through a belt 27 by a sheave 28 secured to the shaft 11. By this construction, it will be evident that the adjustment of the shaft 11 from one of its numbered positions to another will cause rotation of the screen 22. The screen is provided with a plurality of circumferentially and radially spaced slots 29a, 29b, etc., each of which is adapted to expose one of the scales 19a, 19b, etc., to view when positioned under the opening 20. The circumferential length of the slots is so chosen and the sheaves 26 and 28 so dimensioned that, for each of the different positions of the shaft 11, the proper scale on the disc 19 will be exposed through one of the slots 29a, 29b, etc., in position under the viewing opening 20, as shown in Figure 1. It will thus be clearly apparent which scale is to be read. Although all the scales will be visible because of the transparency of the screen, the much greater visibility of the scale revealed through one of the slots 29a, 29b, etc., which happens to be in position, is such as to preclude the accidental reading of the wrong scale.

It will be apparent that the present invention constitutes a substantial improvement over the apparatus of my prior patent in that it enables the operator to read the actual value of the resistance under measurement from one of the scales indicating the setting of the slide-wire adjustment. This permits the final figures for the resistance of a specimen under measurement to be obtained without delay as soon as the bridge has been balanced. The possibility of confusion of the operator by the presence of several scales on the same disc is eliminated by the rotating screen which reveals through one of its slots the particular scale to be read for any setting of the coarse adjustment.

Although I have illustrated and described only a preferred embodiment of the invention, it will be recognized that changes in the details of the construction may be made without departing from the spirit of the invention or the scope of the appended claims.

I claim:

1. In a resistance-measuring apparatus including a resistor variable in steps and a slide-wire resistor, each resistor having a manually operable shaft for adjusting it, the improvement comprising a disc fixed on the shaft of the slide-wire resistor having a plurality of radially spaced concentric scales thereon, one for each setting of the first-mentioned resistor, a screen rotatable on said last-mentioned shaft above said disc and having slots spaced radially and circumferentially thereof adapted to expose said scales one at a time, and means whereby rotation of the shaft of the first-mentioned resistor rotates said screen and successively exposes the scales for the various settings of said first-mentioned resistor.

2. In a resistance-measuring apparatus including a resistor variable in steps and a slide-wire resistor, each resistor having a manually operable shaft for adjusting it, the improvement comprising a disc fixed on the shaft of the slide-wire resistor having a plurality of radially spaced concentric scales thereon, one for each setting of the first-mentioned resistor, a screen rotatable on said last-mentioned shaft above said disc and having slots spaced radially and circumferentially thereof adapted to expose said scales one at a time, and a belt-and-pulley drive connecting the shaft of the first-mentioned resistor and said screen.

3. A resistance-measuring apparatus as defined by claim 1 characterized by said screen being composed of transparent material.

4. In a resistance-measuring apparatus including a resistor variable in steps and a slide-wire resistor, each resistor having a manually operable shaft for adjusting it, the improvement comprising a disc fixed on the shaft of the slide-wire resistor having a plurality of radially spaced concentric scales thereon, one for each setting of the first-mentioned resistor, a screen rotatable on said last-mentioned shaft above said disc and having slots spaced radially and circumferentially thereof adapted to expose said scales one at a time, and means for shifting the screen in accordance with the adjustment of the first-mentioned resistor, to expose the scale for which the resistor is set.

5. A direct-reading resistance-measuring apparatus including a pair of resistors variable in steps and a pair of slide-wires connected thereto adapted to form part of a Kelvin double bridge, manually operable means for adjusting the resistors, a plurality of concentric radially-spaced scales for the slide-wires, a screen thereover having radially and circumferentially spaced slots for exposing said scales individually, and means for shifting the screen in accordance with the adjustment of said first-mentioned resistors.

GROVER R. GREENSLADE.